United States Patent
Choi et al.

(10) Patent No.: US 11,036,917 B2
(45) Date of Patent: Jun. 15, 2021

(54) APPARATUS AND METHOD FOR GENERATING FONT BY MEANS OF METAFONT BY USING OUTLINE FONT

(71) Applicant: FOUNDATION OF SOONGSIL UNIVERSITY INDUSTRY COOPERATION, Seoul (KR)

(72) Inventors: Jaeyoung Choi, Seoul (KR); Geunho Jeong, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 179 days.

(21) Appl. No.: 16/305,486

(22) PCT Filed: Mar. 6, 2017

(86) PCT No.: PCT/KR2017/002365
§ 371 (c)(1),
(2) Date: Nov. 29, 2018

(87) PCT Pub. No.: WO2018/139700
PCT Pub. Date: Aug. 2, 2018

(65) Prior Publication Data
US 2020/0327276 A1    Oct. 15, 2020

(30) Foreign Application Priority Data
Jan. 26, 2017   (KR) ........................ 10-2017-0012703

(51) Int. Cl.
*G06F 40/109* (2020.01)
*G06F 40/166* (2020.01)
(Continued)

(52) U.S. Cl.
CPC ............ *G06F 40/109* (2020.01); *G06F 17/11* (2013.01); *G06F 40/12* (2020.01); *G06F 40/166* (2020.01)

(58) Field of Classification Search
CPC ...... G06F 40/109; G06F 40/166; G06F 40/12; G06F 17/11
See application file for complete search history.

(56) References Cited

U.S. PATENT DOCUMENTS

| 10,019,415 B1 * | 7/2018 | Wombell .......... G06K 9/00718 |
| 2003/0043151 A1 | 3/2003 | Choi et al. |

(Continued)

FOREIGN PATENT DOCUMENTS

| KR | 10-2004-0085659 A | 10/2004 |
| KR | 101342730 B1 | 12/2013 |
| KR | 1020160133271 A | 11/2016 |

OTHER PUBLICATIONS

Korean Notice of Allowance dated Sep. 21, 2018, in connection with the Korean Patent Application No. 10-2017-0012703.

(Continued)

*Primary Examiner* — Beau D Spratt
(74) *Attorney, Agent, or Firm* — Hauptman Ham, LLP

(57) ABSTRACT

An apparatus and method for generating font by means of METAFONT by using outline font are disclosed. The disclosed method for creating a Metafont font may be performed at an apparatus that includes a processor, where the method may include: (a) creating an intermediate code by adding an attribute for Metafont to a code of an outline font written in XML; and (b) creating the Metafont font by using information of points obtained by parsing the intermediate code.

4 Claims, 14 Drawing Sheets

(51) Int. Cl.
*G06F 40/12* (2020.01)
*G06F 17/11* (2006.01)

(56) References Cited

U.S. PATENT DOCUMENTS

| | | | | |
|---|---|---|---|---|
| 2009/0002375 A1* | 1/2009 | Goddeau | ................. | G09G 5/26 |
| | | | | 345/472.1 |
| 2010/0118323 A1* | 5/2010 | Horikawa | .......... | G06K 15/1834 |
| | | | | 358/1.11 |
| 2010/0141976 A1* | 6/2010 | Ohmori | ................. | G06T 11/206 |
| | | | | 358/1.13 |
| 2013/0155098 A1* | 6/2013 | Rickner | ................. | G09G 5/246 |
| | | | | 345/619 |
| 2014/0362104 A1* | 12/2014 | Hitchcock | ............. | G06F 40/109 |
| | | | | 345/593 |
| 2017/0200292 A1* | 7/2017 | Betts | .................... | G06T 11/203 |

OTHER PUBLICATIONS

Korean Office Action dated Mar. 19, 2018, in connection with the Korean Patent Application No. 10-2017-0012703.
Gyeongjae Gwon et al., Structured Korean Font Generator Using Metafont, Kiise Transactions on Computing Practices, Mar. 17, 2016, pp. 449-454, vol. 22, Online.
International Search Report dated Oct. 23, 2017, corresponding to International Application No. PCT/KR2017/002365.

* cited by examiner

FIG. 2

```
1  u#:= 5/9pt#;
2  stem# := 5/9pt#;
3  define_pixels(u, stem);
4  beginchar(66, 13u#, 16u#, 5u#);
5      x1 = 2u; x2=x3=3u;
6      bot y1=-5u; y2=8u; y3=14u;
7      x4=6.5u; top y4=h;
8      z5=(10u,12u); z6=(7.5u, 7.5u); z8=z6;
9      z7=(4u,7.5u); z9=(11.5u, 2u); z0=(5u, u);
10     penpos1(2stem, 20); penpos2(.5stem,0);
11     penpos3(stem, -45); penpos4(.8stem, -90);
12     penpos5(1.5stem, -180); penpos6(.4stem, 150);
13     penpos7(.4stem,0); penpos8(.4stem, 210);
14     penpos9(1.5stem, -180); penpos0(.3stem, 20);
15     pickup pencircle;
16     penstroke z1e..z2e..z3e..z4e..z5e..
17             z6e..{up}z7e..z8e..z9e..{up}z0e;
18     labels(range 1 thru 9);
19 endchar;
20 end
``` stem# := 5/9pt stem# := 9/9pt

FIG. 7

```
<?xml version="1.0" encoding="UTF-8"?>
<glyph name="C" format="1">
  <advance width="601"/>
  <unicode hex="0043"/>
  <outline>
    <contour>
      <point x="536" y="0" type="line"/>
      <point x="515" y="0" type="line"/>
      <point x="484" y="32" type="line"/>
      <point x="424" y="-16"/>
      <point x="325" y="-16" type="qcurve" smooth="yes"/>
      <point x="203" y="-16"/>
      <point x="46" y="170"/>
      <point x="46" y="318" type="qcurve" smooth="yes"/>
      <point x="46" y="462"/>
      <point x="125" y="562" type="qcurve" smooth="yes"/>
    </contour>
  </outline>
</glyph>
```

FIG. 8A

```
<?xml version="1.0" encoding="UTF-8"?>
<glyph name="a" format="1">
  <advance width="1024"/>
  <outline>
    <contour>
      <point penPair="x1l" innerType="fill" serif="1" x="578" y="963" type="line"/>
      <point penPair="x2l" serif="2" x="578" y="413" type="line"/>
      <point penPair="x2r" x="644" y="413" type="line"/>
      <point penPair="x3r" dependX="x2r" x="644" y="753" type="line"/>
      <point penPair="x4r" x="753" y="753" type="line"/>
      <point penPair="x4l" x="753" y="817" type="line"/>
      <point penPair="x3l" dependX="x1r" x="644" y="817" type="line"/>
      <point penPair="x1r" x="644" y="963" type="line"/>
    </contour>
  </outline>
</glyph>
``` single curve continuous curve omit reference point

APPARATUS AND METHOD FOR GENERATING FONT BY MEANS OF METAFONT BY USING OUTLINE FONT

CROSS REFERENCE TO RELATED APPLICATION

This application claims the benefit of Korean Patent Application No. 10-2017-0012703, filed with the Korean Intellectual Property Office on Jan. 26, 2017, and a PCT application PCT/KR2017/002365 filed on Mar. 6, 2017, the disclosure of which is incorporated herein by reference in its entirety.

BACKGROUND

1. Technical Field

Embodiments of the present invention relate to an apparatus and method for creating Metafont fonts, more particularly to an apparatus and method for generating fonts which adopt a scheme for editing outline fonts to thereby enable the user to create a new font in real time, reduce the time and cost for creating a new font compared to writing a font by way of the outline editing scheme, and create a font without having to learn Metafont.

2. Description of the Related Art

Writing (text) is an effective means for recording and sharing information. With the widespread use of smart devices, users are more inclined to use digital fonts, which represent text on digital devices, than analog fonts, such as handwriting. Under such circumstances, digital fonts of various styles are being produced.

Generally used digital fonts include the bitmap font type and the outline font type. With a bitmap font, every character is written as a bitmap image, and in order to support various font sizes, a separate file is needed for each font size. An outline font is a font type in which the method of drawing the shape of a character is written as a function, and writing with an outline font may include drawing the outline of the font using lines and curves and then filling in the inner area. Since an outline font involves calculating the outline information and thus allows a free adjustment of font size, the font can be used regardless of size and can be outputted in a high quality. However, with bitmap fonts and outline fonts, modifying the style, such as the thickness or shape of a stroke, for a previously completed font may require making individual adjustments.

More specifically, since a bitmap font is a font using a fixed image, it may be necessary to produce a new font for a different size of the font. Depending on the required font size, a large amount of time may have to be spent in newly producing the font, and a large amount of storage capacity may be needed for storing the font data.

The outline font, which can resolve the drawbacks above, enables freely adjusting the font size and represents characters of all sizes, and since only one set of font data is needed, the storage capacity may be decreased compared to bitmap fonts, which require large storage capacities. However, a rasterization process is needed, which includes complicated mathematical processing procedures, causing an increase in system load, where the greater the number of points and lines, the greater the increase in load. Also, an outline font includes only information regarding each character's reference points and control points for representing the character and does not include information on the strokes. As such, there is the drawback that, if a font designer wishes to modify the style of a previously completed font, for example in terms of the thickness and shape of stroke, then the reference points and control points have to be altered individually.

Research has been made on Metafont, which, unlike bitmap and outline fonts, uses the strokes of the characters and the shape of the pen. Metafont is a programming language for representing fonts and can represent various characters according to the values cited in the code. Therefore, by representing a modifiable style as a variable parameter when writing the code, and by changing the value of the variable parameter as needed, it is possible to easily create fonts of various styles.

However, since Metafont is a programming language in a text format and not in an image format for outputting, it is difficult for a font designer who is not familiar with programming to use Metafont directly. Moreover, if a Metafont developer who is not familiar with design were to produce a font, the developer would have to use a Metafont programming tool rather than a graphic tool, so that the development of a font using Metafont may incur high costs and expend much time.

SUMMARY OF THE INVENTION

To resolve the problems of the related art described above, an aspect of the invention proposes an apparatus and a method for creating fonts which adopt a scheme for editing outline fonts to thereby enable the user to create a new font in real time, reduce the time and cost for creating a new font compared to writing a font by way of the outline editing scheme, and create a font without having to learn Metafont.

Other objectives of the invention can be derived by the skilled person from the embodiments set forth below.

To achieve the objectives above, an embodiment of the invention provides a method for creating a Metafont font performed at an apparatus that includes a processor, where the method includes: (a) creating an intermediate code by adding an attribute for Metafont to a code of an outline font written in XML; and (b) creating the Metafont font by using information of points obtained by parsing the intermediate code.

The attributes for Metafont can include a first attribute, for designating two points from among the points for forming an outline as a pair, and a second attribute, for designating whether or not to fill the inner area of an outline.

The attributes for Metafont can further include at least one of a third attribute, for changing the position coordinate of point B in a manner dependent on the position coordinate of point A that has been configured beforehand, and a fourth attribute, for configuring the serifs of a point.

The outline font can be a UFO (unified font object) format, and the attributes for Metafont can be included in the 'point' tag in the code of the UFO.

The code of the outline font and the intermediate code can be capable of representing a cubic curve composed of four points and a quadratic curve composed of three points, whereas the Metafont code can be capable of representing only the cubic curve, and said step (b) can include converting a quadratic curve in the intermediate code into a cubic curve in the Metafont code by using a series of equations shown below:

$$CP0 = QP0$$

$$CP3 = QP3$$

$$CP1=QP0+\tfrac{2}{3}(QP1-QP0)$$

$$CP2=QP2+\tfrac{2}{3}(QP1-QP2)$$

where CP0 and CP3 represent two reference points from among the four points, CP1 and CP2 represent two control points from among the four points, QP0 and QP2 represent two reference points from among the three points, and QP1 represents one control point from among the three points.

Another embodiment of the invention provides an apparatus for creating a Metafont font that includes: an intermediate code creation unit configured to create an intermediate code by adding an attribute for Metafont to a code of an outline font written in XML; and an output font creation unit configured to create the Metafont font by using information of points obtained by parsing the intermediate code.

An embodiment of the invention provides the advantage of enabling the user to create a new font in real time, reduce the time and cost for creating a new font compared to writing a font by way of the outline editing scheme, and create a font without having to learn Metafont.

Additional aspects and advantages of the present invention will be set forth in part in the description which follows, and in part will be obvious from the description, or may be learned by practice of the invention.

BRIEF DESCRIPTION OF THE DRAWINGS

FIG. 2 illustrates an example of representing the alphabet character 'B' with a code programmed in Metafont.

FIG. 7 illustrates a code for a UFO according to the related art.

FIG. 8A, FIG. 8B, and FIG. 8C illustrate an example of an intermediate code according to an embodiment of the invention.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the components or steps are necessarily included. That is, some of the components or steps may not be included, while other additional components or steps may be further included. Also, terms such as "part", "module", etc., used in the present specification refer to a unit that processes at least one function or operation, where such a unit can be implemented as hardware or software or as a combination of hardware and software.

Various embodiments of the invention will be described below in more detail with reference to the accompanying drawings.

First, the present specification provides a description of the concept of Metafont, which serves as a basis for the present invention.

Metafont is a font provider system used by TeX, where every character entails a 'character-drawing function', which represents the method of drawing the character, and a 'style parameter', which represents how the character is to be styled. That is, while the method of drawing the character may be fixed, the parameter determining the style (the style value) is separate, so that with Metafont, a user can freely change a font to a desired style by modifying the style parameter.

Figure 1:
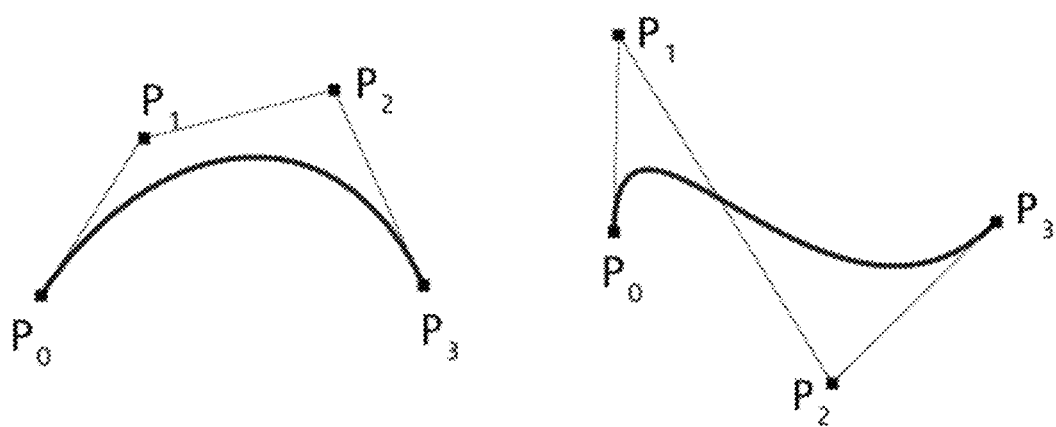
FIG. 1 illustrates examples of representing curves by using four points.

Also, Metafont represents the curves of a letter by using cubic Bézier curves, as illustrated in FIG. 1. Referring to FIG. 1, a curve may be defined by four points. Here, P0 and P3 are the reference points of the curve, while P1 and P2 are control points that define direction. The curve starts at P0 in the direction of P1 and arrives at P3 from the direction of P2, where various free curves can be obtained by moving the control points. Here, the control points P1 and P2 may not lie on the curve and may simply provide directional information.

Since Metafont is a programming language, it is possible to use variable parameters to implement styles that can be modified when writing the code, thereby allowing the user to create various fonts by changing the values of the variable parameters and thus freely modifying the size and thickness of the characters as well as the shape of the pen, etc.

Figure 3A:
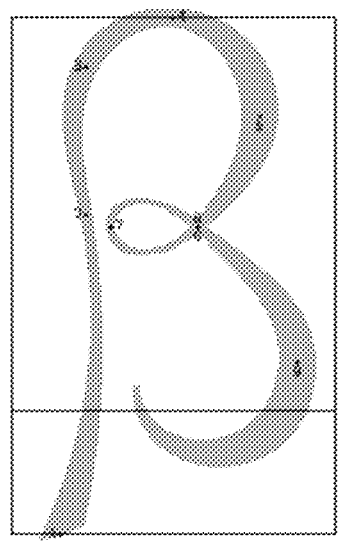
FIG. 3A and FIG. 3B illustrate an example of changing the style of a character in Metafont through a modification made to a variable.
Figure 3B:
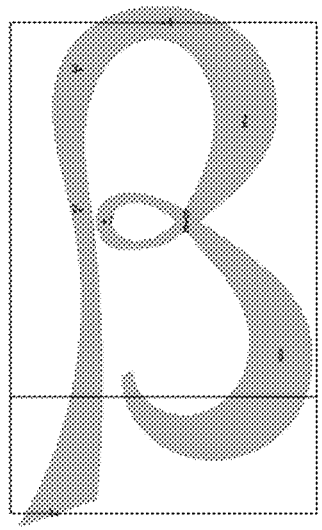

For instance, FIG. 2 illustrates the source code of Metafont for representing the alphabet character 'B', with FIG. 3A illustrating the result created when the source code of FIG. 2 is executed. The stem parameter defined in the second line of the source code is a variable that affects the thickness of the character, and if the stem value is changed, the thickness of the character is changed overall, as can be observed in FIG. 3B.

Figure 4:
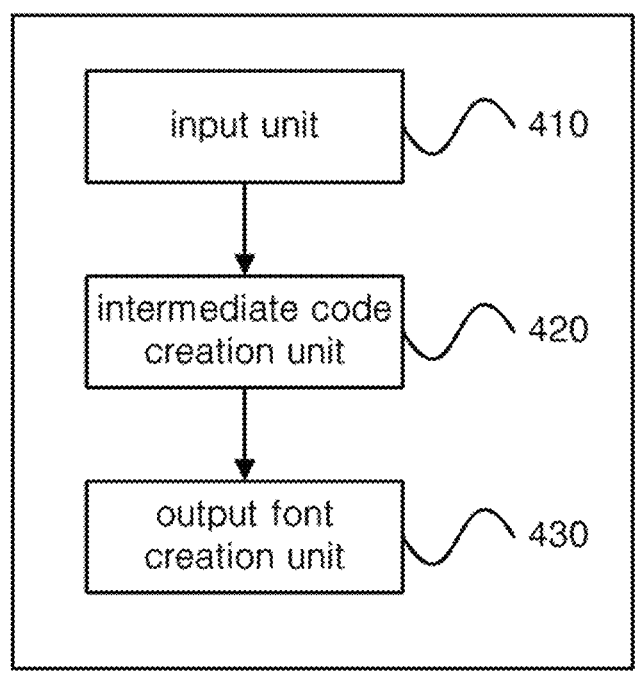
FIG. 4 conceptually illustrates the composition of an apparatus for creating fonts according to an embodiment of the invention.

FIG. 4 conceptually illustrates the composition of an apparatus for creating fonts according to an embodiment of the invention.

Referring to FIG. 4, a font creation apparatus 400 according to an embodiment of the invention may be an apparatus that creates fonts with Metafont and may include an input unit 410, an intermediate code creation unit 420, and an output font creation unit 430.

Figure 5:
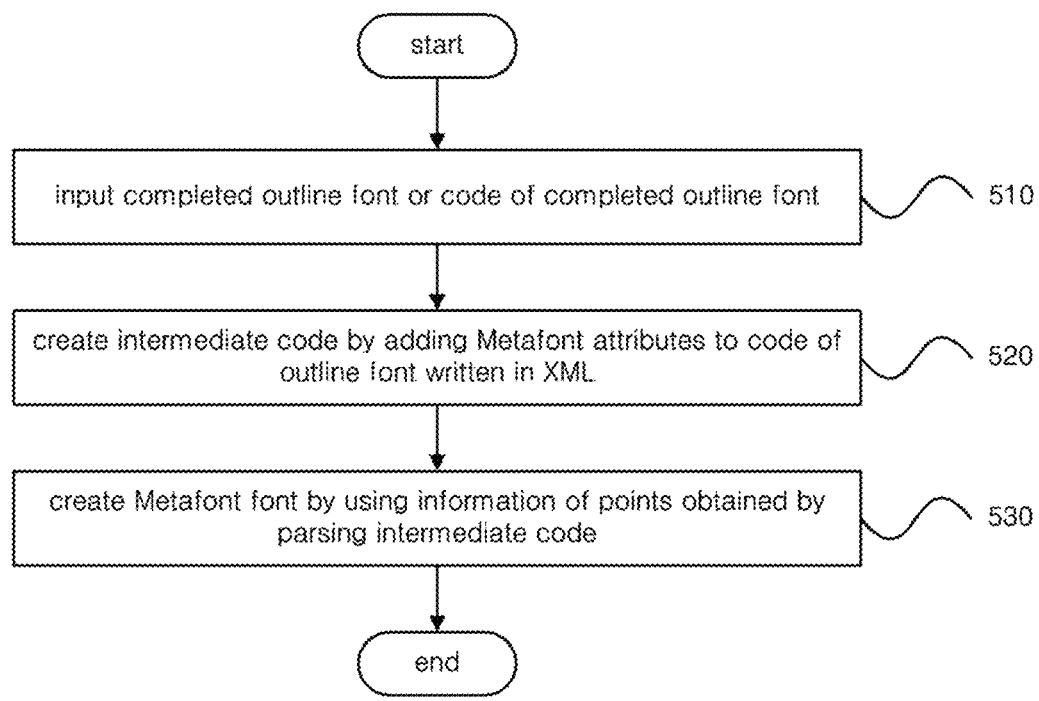
FIG. 5 is a flowchart illustrating the flow of a method for creating a font according to an embodiment of the invention.

Also, FIG. 5 is a flowchart illustrating the flow of a method for creating a font according to an embodiment of the invention. Here, the method can be performed at a font creation apparatus 400, which may be an apparatus that includes a processor.

Figure 6:
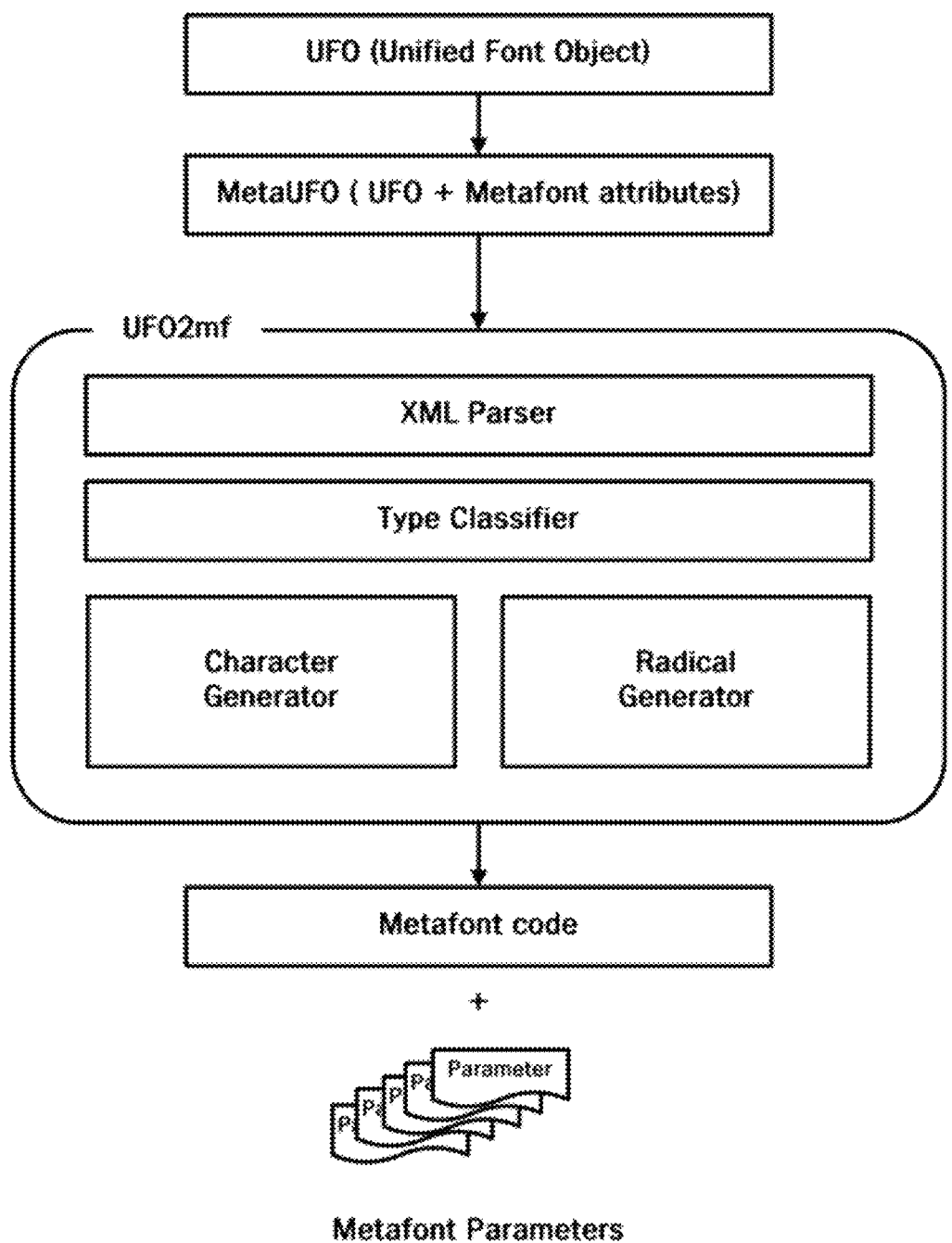
FIG. 6 illustrates the detailed structure of a system for practicing an embodiment of the invention.

Also, FIG. 6 illustrates the detailed structure of a system for practicing an embodiment of the invention.

The function of each component and the procedures performed in each step are described below, with reference to FIGS. 4 to 6.

First, in step 510, the input unit 410 may receive a completed outline font or the code for a completed outline font as input. Here, the completed outline font can be a font written in XML and can be a font created by a font designer.

Next, in step 520, the intermediate code creation unit 420 may create an intermediate code by adding attributes for Metafont to the code of the outline font written in XML.

Then, in step 530, the output font creation unit 430 may use the information of points obtained by parsing the intermediate code to create a Metafont font.

That is, with an embodiment of the invention, attributes required by Metafont and attributes for supporting special functions used by Metafont may be added to the outline font scheme (written in XML) familiar to the font designer when the intermediate code creation unit 420 creates the intermediate code, and the output font creation unit 430 may create a Metafont code by making calculations from the data obtained by parsing the intermediate code received as an input file, so that as a result, the font user can create various styles of fonts by modifying the values of the variable parameters for modifying styles in the generated Metafont code.

The detailed composition of an embodiment of the invention is described as follows.

According to an embodiment of the invention, the outline font can be a font implemented as a UFO (unified font object).

A UFO entails a directory structure, unlike typical outline fonts that are implemented as a single file. Also, unlike other outline fonts that are in a binary form, it is stipulated that the UFO is to have its font data written in XML, so as to have a format that can be read by both persons and machines.

FIG. 7 illustrates a code for a UFO according to the related art. Referring to FIG. 7, the 'point' tag uses 'x' and 'y' attributes to define the position of a point for the purpose of representing lines or curves. Also, the 'type' attribute uses options of 'line', 'curve', 'qcurve', etc., to select the type of line. In the case of a 'line', the points of the previous 'point' tag and the current 'point' tag may be connected to represent a straight line. The options 'curve' and 'qcurve' represent a cubic Bézier and a quadratic Bézier curve from among the types of curves. Since a curve requires reference points and a control point, a control point may be defined by adding a 'point' tag that does not have a 'type' attribute between the two reference points.

A major feature of the UFO is that undefined tags or attributes in XML can be defined by the user. Using this feature, the data required by the system can be added to the code of the UFO to be used after parsing in steps 520 and 530 mentioned above.

In the descriptions below, it will be supposed that the outline font is a UFO, for the sake of convenience. However, the present invention is not limited thus.

Also, according to an embodiment of the invention, the attributes for Metafont added in step 520 can be expressed as Table 1 below, and such attributes can be included in the 'point' tags of the UFO code illustrated in FIG. 7.

TABLE 1

| Attribute Name | Description | Required or Optional |
| --- | --- | --- |
| penPair (First Attribute) | Designates two points as a pair | Required (All Points) |
| innerType (Second Attribute) | Designates whether the inner area of an outline is to be filled or left unfilled | Required (Starting Point) |
| dependX(Y) (Third Attribute) | Causes changes in the X(Y) coordinate to be dependent on designated point | Optional |
| serif (Fourth Attribute) | Configures serif | Optional |

More specifically, Metafont is a scheme which, unlike outline fonts, draws the framework of the character as if writing by hand and then drawing the character while moving along the flow of the framework with a pen. Thus, whereas it may be difficult to modify the thickness of a character in an outline font, this modification can be easily accomplished in a Metafont font by using a function that adjusts the thickness of the pen that fills in the framework. Here, in order to use a function for adjusting the pen thickness, the two end points of the pen must be defined. That is, an operation may be needed for linking the points within a UFO into pairs in accordance with the two end points of the pen, and a first attribute (penPair) may be used for this purpose. The first attribute (penPair) may be an attribute for designating two points into a pair, from among the points for forming an outline, and may be a critically required attribute. Here, it is possible to adjust thickness by adding the attribute 'penPair' to 'point' tags present in an existing UFO and thus providing the information that such two points are one pair.

Also, Metafont uses a different function for filling in or leaving empty the inner area formed by connected outlines, and a second attribute (innerType) may be used for this purpose. The second attribute (innerType) may be an attribute for designating whether or not to fill the inner area of the outlines and may be a critically required attribute.

Also, a third attribute (dependX(Y)) may be an attribute for changing the position coordinate of point B in a manner dependent on the position coordinate of point A, the position coordinate of which was configured beforehand, and a fourth attribute (serif) may be an attribute for configuring the serif of a point. The third and fourth attributes may be optionally included attributes.

In addition to the above, an embodiment of the invention can provide custom variable parameters that allow the user to concurrently change the positions of certain points, and using such attributes, the user can implement certain desired parts as variable parameters.

A more detailed description of the attributes for Metafont is provided below with reference to FIGS. 8A to 8C and FIGS. 9A to 9C.

Figure 8B:
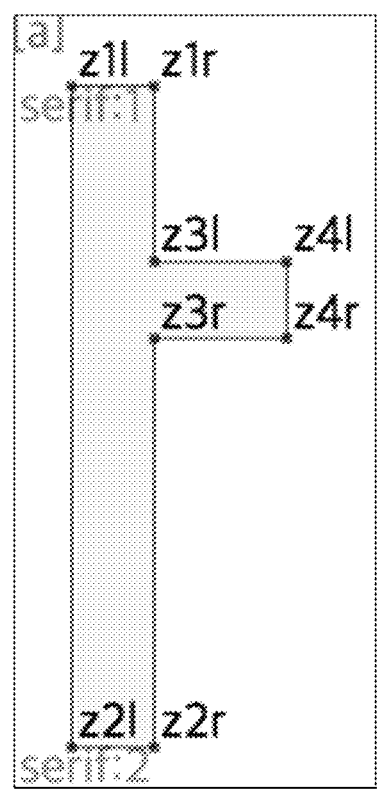
Figure 8C:
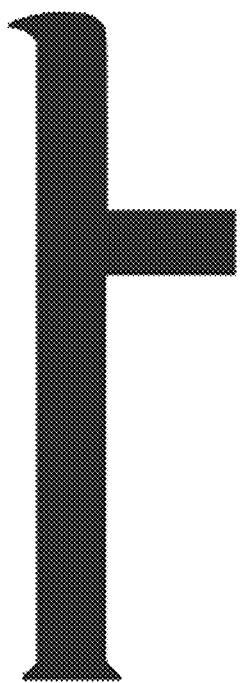

FIGS. 8A to 8C illustrate an example of an intermediate code according to an embodiment of the invention. That is, FIG. 8A illustrates an intermediate code with attributes for Metafont added to a UFO representing the Korean vowel radical 'ㅏ', and FIG. 8B illustrates the intermediate code illustrated in FIG. 8A as an image. Also, FIG. 8C illustrates the radical 'ㅏ' (with serifs) as a Metafont font created by way of FIGS. 8A and 8B.

Referring to FIGS. 8A to 8C, the attribute 'penPair' (first attribute) may be added to the 'point' tags in a UFO code. Here, it can be seen that two points are linked as a pair by way of 'zNl' and 'zNr'. Here, 'l' is a symbol representing a left point, 'r' is a symbol representing a right point, and the numerical value of N in 'zN' is used to denote which two points are connected as a pair. That is, 'z1l' and 'z1r' are linked as a pair, 'z2l' and 'z2r' are linked as a pair, 'z3l' and 'z3r' are linked as a pair, and 'z4l' and 'z4r' are linked as a pair.

Also, the attribute 'innerType' (second attribute) may be added to the 'point' tags in the UFO code. As the inner area of the outline in the radical 'ㅏ' is to be filled in, the 'innerType' in the first 'point' tag may be set to 'fill'.

Also, the attribute 'dependX' (third attribute) may be added to the 'point' tags in the UFO code. For example, in the fourth 'point' tag, 'z3r' is defined, but 'z3r' is made dependent on 'x2r', which is the x-axis coordinate of the point 'z2r' of which the position coordinates have been configured beforehand, and thus is made to move its position by the amount of change in thickness of said point. As another example, 'z3l' is defined in the seventh 'point' tag, but 'z3l' is made dependent on 'x1r', which is the x-axis coordinate of the point 'z1r' of which the position coordinates have been configured beforehand, and thus is made to move its position by the amount of change in thickness of said point. That is, 'z3l' and 'z3r' may move in a manner dependent on the x-axis coordinates of 'z1r' and 'z2r', respectively, moving by the amounts of change of the x-axis coordinates of 'z1r' and 'z2r', so that the straight line may maintain a linear form.

Also, the attribute 'serif' (fourth attribute) may be added to the 'point' tags in the UFO code. That is, serifs may be added to the two ends (z1l, z2l) of the vertical stroke. Here, the serifs may be represented at corresponding positions of the Metafont font created by the output font creation unit 430.

According to an embodiment of the invention, the output font creation unit 430 may create a Metafont font by using the information of points acquired by parsing an intermediate code (MetaUFO) as described above. Here, the output font creation unit 430 can be implemented with Python, and the intermediate code (MetaUFO) can be parsed using the XML Parser, which is a library provided by Python. The output font creation unit 430 may calculate the data required in Metafont from the data obtained by parsing, to write a Metafont code. Also, functions corresponding to the attributes for Metafont added by the user may be called and processed additionally. Also, fourteen variable parameters provided to the user for changing the styles of the letters may be applied in creating the Metafont code. Such variable parameters can be added or removed as necessary.

Unlike the Roman alphabet, the Korean alphabet expresses a syllabic block as a combination of an initial, a medial, and a final. Thus, the output font creation unit 430 can create a letter by calling the required consonant and vowel radicals for the initial, medial, and final, which may be stored in a file. To this end, the output font creation unit 430 may use the data obtained via parsing to determine whether the file currently being processed is for a radical or for a syllabic block that calls radicals and then execute a corresponding routine accordingly.

Here, if the currently processed file is for a combinational block that requires calling consonant and vowel radicals, the output font creation unit 430 may determine the consonant and vowel radicals referenced and may create Metafont functions for calling the corresponding radicals as well as variable parameters applied to each of the consonant and vowel radicals. Also, the output font creation unit 430 may create a code by applying variable parameters for the width, height, and inclination of the letters, which may affect the overall style of the letters.

If the currently processed file is for a consonant or vowel radical, the output font creation unit 430 may represent the letter in Metafont by using the information of the points obtained through parsing. To represent a letter in Metafont, the output font creation unit 430 may first define reference points, designate a thickness for a pair of two linked points, define the control points, and then represent the letter by using a function for drawings curves. Thus, the output font creation unit 430 may use the data obtained by parsing in the manner above to write a code and apply various variable parameters affecting the letter.

Also, as mentioned above, a UFO may represent character outlines as three types, i.e. a straight line, a cubic curve defined by four points, and a quadratic curve defined by three points. Here, the code of the UFO and the intermediate code (MetaUFO) can both represent cubic curves and quadratic curves, but the code in Metafont can represent only cubic curves. Therefore, the output font creation unit 430 according to an embodiment of the invention can create a code for converting a quadratic curve of the intermediate code (MetaUFO) into a cubic curve for Metafont by using Equation 1 shown below.

$$CP0=QP0$$

$$CP3=QP3$$

$$CP1=QP0+\tfrac{2}{3}(QP1-QP0)$$

$$CP2=QP2+\tfrac{2}{3}(QP1-QP2) \quad \text{[Equation 1]}$$

Here, CP0 and CP3 represent the two reference points among the four points for the cubic curve, CP1 and CP2 represent the two control points among the four points for the cubic curve, QP0 and QP2 represent the two reference points from among the three points for the quadratic curve, and QP1 represents the one control point from among the three points for the quadratic curve.

Figure 9A:
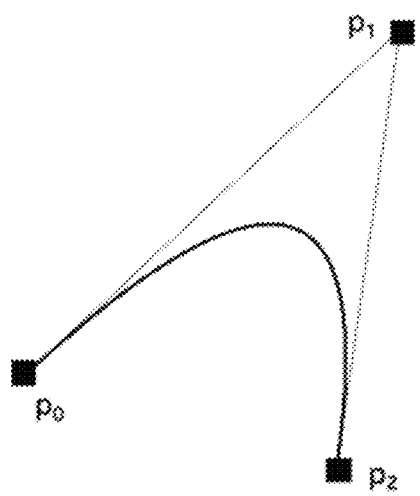
FIG. 9A, FIG. 9B, and FIG. 9C illustrate ways for representing curves according to an embodiment of the invention.
Figure 9B:
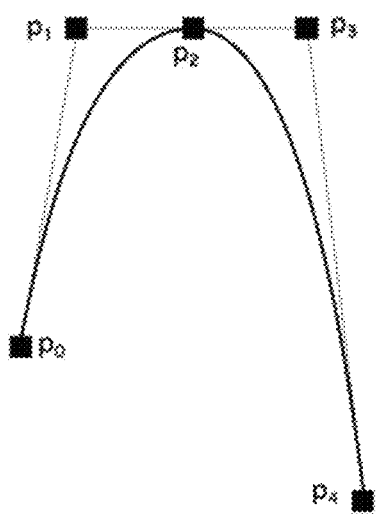
Figure 9C:
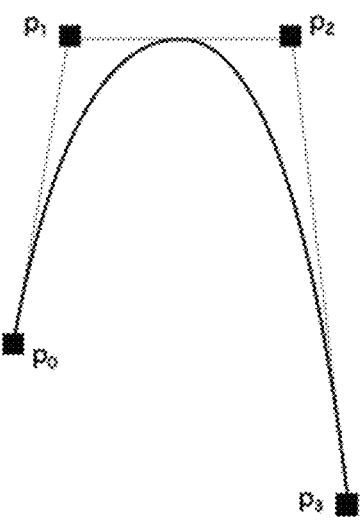

Also, as a quadratic Bézier curve is a quadratic equation, it requires a starting point P0, and end point P2, and a control point P1, as illustrated in FIG. 9A. More complicated curves may be represented by connecting more than one curves, for example by connecting the quadratic Bézier curves (P0, P1, P2) and (P2, P3, P4) as in FIG. 9B. Also, in most font formats, several connected quadratic Bézier curves are represented as a single curve. That is, as illustrated in FIG. 9C, the reference point located between two control points in a continuous curve can be omitted, to show the starting point, end point, and two control points. Since the connected curves share a reference point and have the same slope value for the tangent lines with respect to the reference point, substituting the P2 value into the equations obtained as derivatives of the two curves would result in the same value. By calculating these equations, it can be seen that P2 as a middle point of P1 and P3. Therefore, it is possible to represent a curve even if the reference point located between two control points in a continuous curve is omitted as in FIG. 8C.

An embodiment of the invention may include functionality for converting a curve expression of an outline font represented by a quadratic curve scheme and a cubic curve scheme into wholly cubic curves so as to enable representation by Metafont. This operation may be performed by the output font creator unit 430 (step 530).

In summary, an embodiment of the invention may generate a new font by applying Metafont attributes to a UFO, which is a type of outline font, in creating a Metafont code. Whereas with existing outline fonts, the user is unable to change the thickness or style of a letter with a high degree of freedom, it is possible with Metafont to freely alter the style by using variable parameters. Therefore, even without the 'font family', which were several sets of fonts provided for an outline font that were produced to incorporate changes in style such as thickness, it is possible to create a Metafont code from a basic outline font to enable the user to freely adjust the thickness, in accordance with the variable parameter adjusted by the user. Moreover, variable parameters customized according to the characteristics of the Korean alphabet can be provided, to allow the user to create letters of a variety of shapes.

Certain embodiments of the invention can be implemented in the form of program instructions that may be executed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., configured specially for storing and executing program instructions. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, etc., by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method for creating a Metafont font, the method performed at an apparatus including a processor, the method comprising:
    (a) creating an intermediate code by adding an attribute for Metafont to a code of an outline font written in XML; and
    (b) creating the Metafont font by using information of points obtained by parsing the intermediate code,
    wherein the attribute for Metafont comprises a first attribute and a second attribute, the first attribute associated with designating two points from among the points for forming an outline as a pair, the second attribute associated with designating whether or not to fill an inner area of an outline,
    wherein the attribute for Metafont further comprises at least one of a third attribute and a fourth attribute, the third attribute associated with changing a position coordinate of point B in a manner dependent on a position coordinate of point A, said point A having the position coordinate thereof configured beforehand, the fourth attribute associated with configuring a serif of a point,
    wherein the outline font is a UFO (unified font object), and the attribute for Metafont is included in a 'point' tag in a code of the UFO.

2. The method for creating a Metafont font according to claim 1, wherein the code of the outline font and the intermediate code are capable of representing a cubic curve composed of four points and a quadratic curve composed of three points, the Metafont code is capable of representing only the cubic curve,
    and said step (b) comprises converting a quadratic curve in the intermediate code into a cubic curve in the Metafont code by using a series of equations shown below:

$$CP0=QP0$$

$$CP3=QP3$$

$$CP1=QP0+\tfrac{2}{3}(QP1-QP0)$$

$$CP2=QP2+\tfrac{2}{3}(QP1-QP2)$$

where CP0 and CP3 represent two reference points from among the four points, CP1 and CP2 represent two control points from among the four points, QP0 and QP2 represent two reference points from among the three points, and QP1 represents one control point from among the three points.

3. A non-transitory computer-readable recording medium storing a program of instructions for performing a method for creating a Metafont font, the method performed by an apparatus including a processor, wherein the method comprises:
    (a) creating an intermediate code by adding an attribute for Metafont to a code of an outline font written in XML; and
    (b) creating the Metafont font by using information of points obtained by parsing the intermediate code,
    wherein the attribute for Metafont comprises a first attribute and a second attribute, the first attribute associated with designating two points from among the points for forming an outline as a pair, the second attribute associated with designating whether or not to fill an inner area of an outline,
    wherein the attribute for Metafont further comprises at least one of a third attribute and a fourth attribute, the third attribute associated with changing a position coordinate of point B in a manner dependent on a position coordinate of point A, said point A having the position coordinate thereof configured beforehand, the fourth attribute associated with configuring a serif of a point,
    wherein the outline font is a UFO (unified font object), and the attribute for Metafont is included in a 'point' tag in a code of the UFO.

4. An apparatus for creating a Metafont font, the apparatus comprising a processor, wherein the processor is configured to:
    create an intermediate code by adding an attribute for Metafont to a code of an outline font written in XML; and
    create the Metafont font by using information of points obtained by parsing the intermediate code,
    wherein the attribute for Metafont comprises a first attribute and a second attribute, the first attribute associated with designating two points from among the points for forming an outline as a pair, the second attribute associated with designating whether or not to fill an inner area of an outline,
    wherein the attribute for Metafont further comprises at least one of a third attribute and a fourth attribute, the third attribute associated with changing a position coordinate of point B in a manner dependent on a position coordinate of point A, said point A having the position coordinate thereof configured beforehand, the fourth attribute associated with configuring a serif of a point,
    wherein the outline font is a UFO (unified font object), and the attribute for Metafont is included in a 'point' tag in a code of the UFO.

* * * * *